US009304768B2

(12) United States Patent
Ruehle

(10) Patent No.: US 9,304,768 B2
(45) Date of Patent: Apr. 5, 2016

(54) CACHE PREFETCH FOR DETERMINISTIC FINITE AUTOMATON INSTRUCTIONS

(71) Applicant: Intel Corporation, Santa Clara, CA (US)

(72) Inventor: Michael Ruehle, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 642 days.

(21) Appl. No.: 13/718,966

(22) Filed: Dec. 18, 2012

(65) Prior Publication Data

US 2014/0173254 A1    Jun. 19, 2014

(51) Int. Cl.
*G06F 9/38* (2006.01)
*G06F 9/30* (2006.01)
*G06F 12/08* (2006.01)
*G06F 9/00* (2006.01)

(52) U.S. Cl.
CPC .......... *G06F 9/30047* (2013.01); *G06F 9/3802* (2013.01); *G06F 12/0862* (2013.01); *G06F 2212/6026* (2013.01)

(58) Field of Classification Search
None
See application file for complete search history.

(56) References Cited

U.S. PATENT DOCUMENTS

| | | | |
|---|---|---|---|
| 5,485,620 A | 1/1996 | Sadre | |
| 5,870,576 A | 2/1999 | Faraboschi | |
| 5,937,181 A | 8/1999 | Godefroid | |
| 6,122,757 A | 9/2000 | Kelley | |
| 6,697,276 B1 | 2/2004 | Pereira | |
| 6,700,809 B1 | 3/2004 | Ng | |
| 6,934,796 B1 | 8/2005 | Pereira | |
| 7,119,577 B2 | 10/2006 | Sharangpani | |
| 7,382,637 B1 | 6/2008 | Rathnavelu | |
| 7,539,032 B2 | 5/2009 | Ichiriu | |
| 7,710,988 B1 | 5/2010 | Tripathi | |
| 7,805,392 B1 | 9/2010 | Steele | |
| 7,899,904 B2 | 3/2011 | Ruehle | |
| 7,945,528 B2 | 5/2011 | Cytron | |
| 8,024,802 B1 | 9/2011 | Preston | |
| 8,051,085 B1 | 11/2011 | Srinivasan | |
| 8,347,384 B1 | 1/2013 | Preston | |
| 8,448,249 B1 | 5/2013 | Preston | |

(Continued)

OTHER PUBLICATIONS

Morita, et al. (Apr. 1994). Parallel generation and parsing of array languages using reversible cellular automata. International Journal of Pattern Recognition and Artificial Intelligence, 8(02), 543-561.

(Continued)

*Primary Examiner* — Scott Sun
(74) *Attorney, Agent, or Firm* — Barnes & Thornburg LLP

(57) ABSTRACT

In a DFA scanning engine used to match regular expressions or similar rules, instructions to execute DFA state transitions are accessed through an instruction cache. Each DFA instruction may indicate varying numbers of transitions or branches from a current state. The cache pre-fetches a requested number of additional instructions consecutively following an accessed instruction. The DFA engine accesses an instruction from the cache corresponding to a state within a small number of transitions from the root state. When a low-branching instruction is executed to access a next instruction from the root state, or when a low-branching instruction is executed to access a next instruction from the cache, a fixed or configurable pre-fetch length is requested. Some instructions such as low-branching instructions may contain a pre-fetch hint.

22 Claims, 4 Drawing Sheets

(56) References Cited

U.S. PATENT DOCUMENTS

| | | | |
|---|---|---|---|
| 8,516,456 B1 | 8/2013 | Starovoitov | |
| 8,572,106 B1 | 10/2013 | Estan | |
| 8,862,603 B1 | 10/2014 | Watson | |
| 8,964,548 B1 | 2/2015 | Keralapura | |
| 2001/0014936 A1 | 8/2001 | Jinzaki | |
| 2002/0124162 A1 | 9/2002 | Yung | |
| 2003/0051043 A1 | 3/2003 | Wyschogrod | |
| 2003/0065800 A1 | 4/2003 | Wyschogrod | |
| 2004/0162826 A1 | 8/2004 | Wyschogrod | |
| 2004/0215593 A1 | 10/2004 | Sharangpani | |
| 2005/0012521 A1 | 1/2005 | Sharangpani | |
| 2005/0198625 A1 | 9/2005 | Shi | |
| 2005/0273450 A1 | 12/2005 | McMillen | |
| 2006/0101195 A1 | 5/2006 | Jain | |
| 2006/0136570 A1* | 6/2006 | Pandya | 709/217 |
| 2006/0277534 A1 | 12/2006 | Kasuya | |
| 2007/0130140 A1 | 6/2007 | Cytron | |
| 2007/0182540 A1 | 8/2007 | Marman | |
| 2008/0034427 A1 | 2/2008 | Cadambi | |
| 2008/0046423 A1 | 2/2008 | Khan Alicherry | |
| 2008/0059464 A1 | 3/2008 | Law | |
| 2008/0071780 A1 | 3/2008 | Ichiriu | |
| 2008/0109431 A1 | 5/2008 | Kori | |
| 2008/0140600 A1 | 6/2008 | Pandya | |
| 2008/0270342 A1 | 10/2008 | Ruehle | |
| 2008/0271141 A1 | 10/2008 | Goldman | |
| 2009/0063825 A1 | 3/2009 | McMillen | |
| 2009/0119399 A1 | 5/2009 | Hussain | |
| 2009/0177669 A1 | 7/2009 | Ramarao | |
| 2009/0327252 A1 | 12/2009 | Zhang | |
| 2010/0095367 A1 | 4/2010 | Narayanaswamy | |
| 2010/0191958 A1 | 7/2010 | Chen | |
| 2010/0192225 A1 | 7/2010 | Ma | |
| 2010/0198850 A1 | 8/2010 | Cytron | |
| 2010/0229238 A1 | 9/2010 | Ma | |
| 2010/0232447 A1 | 9/2010 | Jing | |
| 2011/0022617 A1 | 1/2011 | Yamagaki | |
| 2011/0093496 A1 | 4/2011 | Bando | |
| 2011/0145181 A1 | 6/2011 | Pandya | |
| 2011/0196971 A1 | 8/2011 | Reguraman | |
| 2011/0219208 A1 | 9/2011 | Asaad | |
| 2011/0258210 A1 | 10/2011 | Agarwal | |
| 2011/0307433 A1 | 12/2011 | Dlugosch | |
| 2012/0011094 A1 | 1/2012 | Yamagaki | |
| 2012/0330868 A1 | 12/2012 | Tago | |
| 2012/0331554 A1 | 12/2012 | Goyal | |
| 2013/0046954 A1 | 2/2013 | Ruehle | |
| 2013/0073503 A1 | 3/2013 | Nagao | |
| 2013/0111503 A1 | 5/2013 | Tago | |
| 2014/0040261 A1 | 2/2014 | Horne | |
| 2014/0101185 A1 | 4/2014 | Ruehle | |
| 2014/0114996 A1 | 4/2014 | Ruehle | |
| 2014/0115263 A1 | 4/2014 | Ruehle | |
| 2014/0143195 A1 | 5/2014 | Ruehle | |
| 2014/0173603 A1 | 6/2014 | Ruehle | |
| 2014/0208076 A1 | 7/2014 | Ruehle | |
| 2014/0229926 A1 | 8/2014 | Xu | |

OTHER PUBLICATIONS

Suejb Memeti, "Automatic Java Code Generator for Regular Expression and Finite Automata", published by Linneaeus Univeristy, Vaxjo, SE, for Degree Project, May 2012, pp. 1-47.

Michela Becchi, Charlie Wiseman, Patrick Crowley, "Evaluating Regular Expression Matching Engines on Network and General Purpose Processors", 5th ACM/IEEE Symposium on Architectures for Networking and Communications Systems (ANCS'09), Oct. 2009, pp. 30-39.

Michela Becchi, Mark Franklin, and Patrick Crowley, "A Workload for Evaluating Deep Packet Inspection Architectures", Workload Characterization, 2008. IISWC 2008. IEEE International Symposium on, Oct. 2008, pp. 79-89.

Michela Becchi, Patrick Crowley, "A Hybrid Finite Automaton for Practical Deep Packet Inspection", CoNEXT '07 Proceedings of the 2007 ACM CoNEXT conference, Dec. 2007, pp. 1-12.

* cited by examiner

CACHE PREFETCH FOR DETERMINISTIC FINITE AUTOMATON INSTRUCTIONS

FIELD OF THE INVENTION

The field of the invention relates generally to computer systems and more specifically to processing of symbols.

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols. Further, instructions in other languages may be included with these standards, such as Java and Visual Basic. There are numerous instances when information may be interpreted to make routing decisions. In an attempt to reduce the complexity associated with routing decisions, it is common for protocols to be organized in a matter resulting in protocol specific headers and unrestricted payloads. Subdivision of the packet information into packets and providing each packet with a header is also common at the lowest level, for example TCP/IP. This enables the routing information to be at a fixed location thus making it easy for routing hardware to find and interpret the information. With the increasing nature of the transmission, of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature. The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

SUMMARY OF THE INVENTION

An embodiment of the invention may therefore comprise a method of pre-fetching instructions to an instruction cache for a DFA engine during a DFA descent, said DFA descent comprising a transition depth and a branching value, the method comprising accessing an instruction from an instruction cache, and pre-fetching a number of instructions immediately following the accessed instruction to the instruction cache.

An embodiment of the invention may further comprise a system of pre-fetching instructions into an instruction cache for use in a DFA engine, the system comprising an instruction cache enabled to fetch instructions from an external memory' and a DFA engine enabled to access instructions from the instruction cache, and to execute said instructions and to request pre-fetch of instructions to the instruction cache based on an algorithm.

DETAILED DESCRIPTION OF THE EMBODIMENTS

Figure 1:
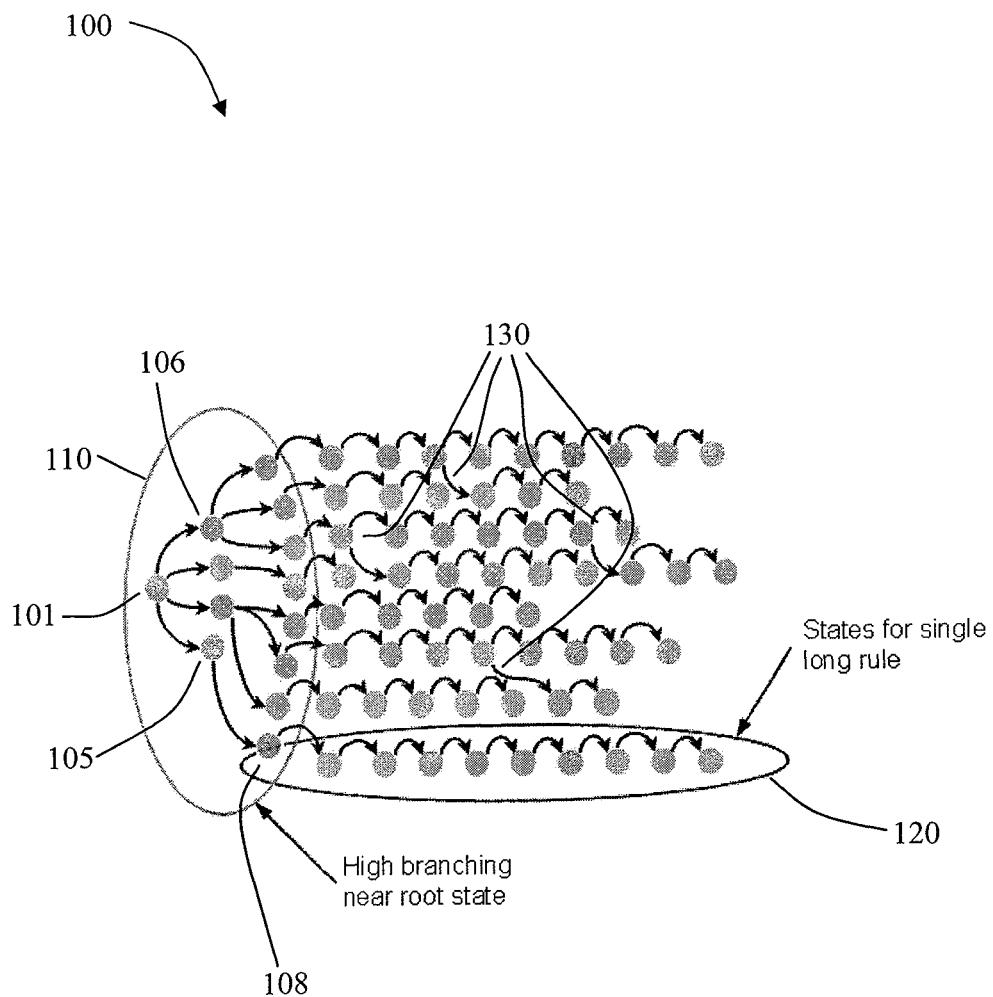
FIG. 1 is a diagram of an example of a typical DFA state.

Performing lexical analysis or pattern matching is generally a computationally expensive step. This is because every symbol of information needs to be examined and dispositioned.

Regular expressions are used for pattern matching and lexical analysis. Regular expressions provides a concise and flexible means for "matching" strings of text, such as particular characters, words, or patterns of characters. Abbreviations for "regular expression" include "regex" and regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings Examples of specifications that could be expressed in a regular expression are as follows:
  the sequence of characters "car" appearing consecutively in any context, such as in "car", "cartoon", or "bicarbonate"
  the sequence of characters "car" occurring in that order with other characters between them, such as in "Icelander" or "chandler"
  the word "car" when it appears as an isolated word
  the word "car when preceded by the word "blue" or "red"
  the word "car" when not preceded by the word "motor"
  a dollar sign immediately followed by one or more digits, and then optionally a period and exactly two more digits (for example, "$100" or "$245.98").

These sequences are simple and are intended only for purposes of example. Specifications of great complexity are conveyable by regular expressions.

Regular expressions are used by many text editors, utilities, and programming languages to search and manipulate text based on patterns. Some of these languages, including Perl, Ruby, AWK, and Tcl and may integrate regular expressions into the syntax of the core language itself. Other programming languages like .NET languages, Java, and Python provide regular expressions through standard libraries.

To find matches to regular expressions or similar pattern matching rules within a symbol stream, two main types of state machines may be constructed, nondeterministic and deterministic finite automata (NFAs and DFAs). Abstractly, an NFA or DFA is a directed graph in which each graph vertex is a state and each graph edge is labeled with a class of input symbols that it accepts. A transition from a source state to a destination state is represented on that symbol class. The defining difference between NFAs and DFAs is that any two out-transitions from a DFA state must have non-intersecting symbol classes, whereas a single NFA state may have multiple out-transitions labeled with classes containing the same symbol.

Executing a DFA to find rule matches in a symbol stream involves making a traversal or descent of the DFA graph while examining and consuming consecutive symbols of the input stream. The descent begins in a root state, and a first symbol is examined to determine which transition from the root state, if any, has a symbol class containing that first symbol. If a transition is found matching the first symbol, the symbol is consumed and the descent moves to the destination state of the matching transition. In that state, the next input symbol is examined and consumed to make a matching transition to a further next state, and so on until no transition matches and the DFA descent terminates. During the descent, accepting states may be visited, which indicate that one or more rules have been matched, each match typically beginning with the first symbol consumed and ending with the most recent symbol consumed. Such rule matches may be reported, such as by outputting a token comprising a rule ID and the start and end positions of the match.

The states and transitions of a DFA may be represented in instructions, where one or more instructions encode the transitions from each DFA state. In some cases, a single instruction may indicate the number of transitions in a corresponding current state and may encode a method of determining which transition should be taken based on the current input symbol and a method of determining the address of a next instruction corresponding to the determined transition or next state.

A hardware DFA engine performing a DFA descent typically accesses instructions through an instruction cache because DFAs are often very large in terms of quantities of states, transitions, and instructions. When accessed, the instruction cache, using any cache architecture, may "hit", meaning the accessed instruction is present in a small local memory, and return the instruction relatively quickly, for instance in 1 clock cycle. An accessed instruction may also "miss", meaning the accessed instruction is not present in the small local memory. In such a circumstance, the instruction will need to be fetched from elsewhere, such as external memory, which may take as much as 60 cycles, for example. Whenever there is a cache miss, the DFA descent is delayed until the accessed instruction is retrieved from external memory. Therefore frequent cache misses can be a significant performance inhibitor for a DFA engine.

Because DFAs are commonly very large, only a relatively small portion of instructions may be present in the cache at a time. This may result in relatively higher cache miss rates. In particular, when a DFA engine matches or partially matches a rule which has not been matched recently, few or no instructions associated with the rule may be present in the cache. While the rule is matching, every instruction access, or every access within a new cache line, may miss the cache. For a moderately long rule, a great deal of time may be lost waiting for instructions. In some applications with moderately large rule sets, it is likely that each rule matched has not been matched recently enough to have many instructions in the cache.

In an embodiment of a method of the invention, a pre-fetch of DFA instructions following accessed instructions is performed. The pre-fetch may be limited to circumstances when it is more helpful and may vary the number of pre-fetched instructions.

In a DFA generated from a substantially large ruleset for one of many applications, graph topology near the root state is often more complex than deeper in the automaton. At the root, all rules are able to begin matching. There are many root branches corresponding to many different first symbols and symbol classes of the rules. High branching often continues but decreases for a few levels away from the root state. This is much like the manner in which a dictionary matches many word with a first letter but fewer matches are available the more in-depth one looks at the word. Within a fairly small number of transitions from a root state, for example 2 to 5 transitions, typical rules used in DFAs have distinguished themselves from other rules. At such a point, branching tends to become lower, for example 1 to 2 branches from each state. It is understood that this type of DFA behavior is not absolute or uniform. Rather, it is a tendency that may be utilized by the methods and systems of this invention. It is also understood, that high branching states may appear deeper in a DFA. This may occur, for example, when a group of rules deliberately match an identical prefix pattern, but then suddenly diverge to match many different suffix patterns. This is similar to the appearance of another characteristic DFA structure appearing with its high-branching root deep inside another DFA.

States near the root tend to be high-branching. They have large corresponding instruction blocks. As each descent through such a state may access only one instruction from the block, access is sparse. Partial "false positive" matching from random matching behavior is much more common near the root state. This is similar to a random two-letter sequence having a moderate probability of matching the first two letters of some word in a dictionary. A random four-letter sequence is less likely to match a start of any word. As an example, selecting a random dictionary, the probability of a random K-letter sequence matching the start of some word is: for K=1, 100%; for K=2, 47%; for K=3, 18%; for K=5, 0.3%. After a rule has successfully matched for a few symbols, it is more likely that the input is not stimulating the rule in a random fashion. It is either matching the rule or matching some meaningful structure corresponding to the beginning of the rule. It is relatively likely that the input will continue matching the rule. After a DFA descent passes a few transitions away from the root state, such as 2 to 5 transitions, sparse access patterns in corresponding instructions typically become uncommon, and roughly sequential access patterns typically become common.

FIG. 1 is a diagram of an example of a typical DFA. The DFA 100 starts with a root state 101. The initial root state 101 branches into four second level states. The root state 101 can be considered a high-branching state. The second tier states likewise branch into a number of tertiary level states. One of the secondary states is a high branching state 106. Another of the secondary states is not a high branching state 105. For the purposes of this example, the high-branching near root states 110 include the root state 101 and those that are 1 and 2 transitions removed from the root state 101. It is understood that the states that are 1 and 2 transitions removed from the root state may contain many more transitions than those shown in the example DFA 100. Additional states for a single long rule 120 are shown in the transitions from the high branching near root states 110.

Figure 2:
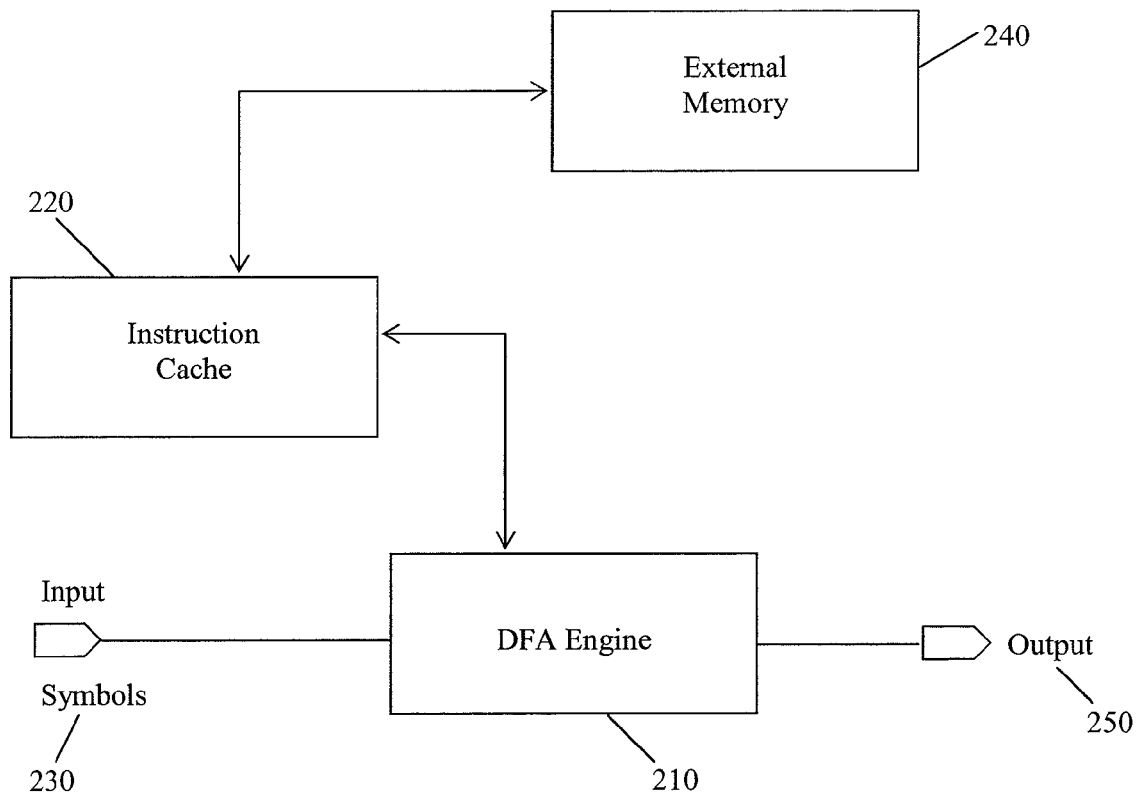
FIG. 2 is a block diagram of an embodiment of the invention.

FIG. 2 is a block diagram of an embodiment of a DFA engine. The DFA engine 210 is enabled to receive and fetch instructions from an instruction cache 220. The instruction cache 220 is enabled to receive and fetch instructions from an external memory 240. It is understood that the instruction cache 220 can vary in size and may store more or less instructions at any time. The DFA engine is also enabled to receive input symbols 230 from an input stream and to produce outputs 250 such as tokens resulting from matches.

Figure 3:
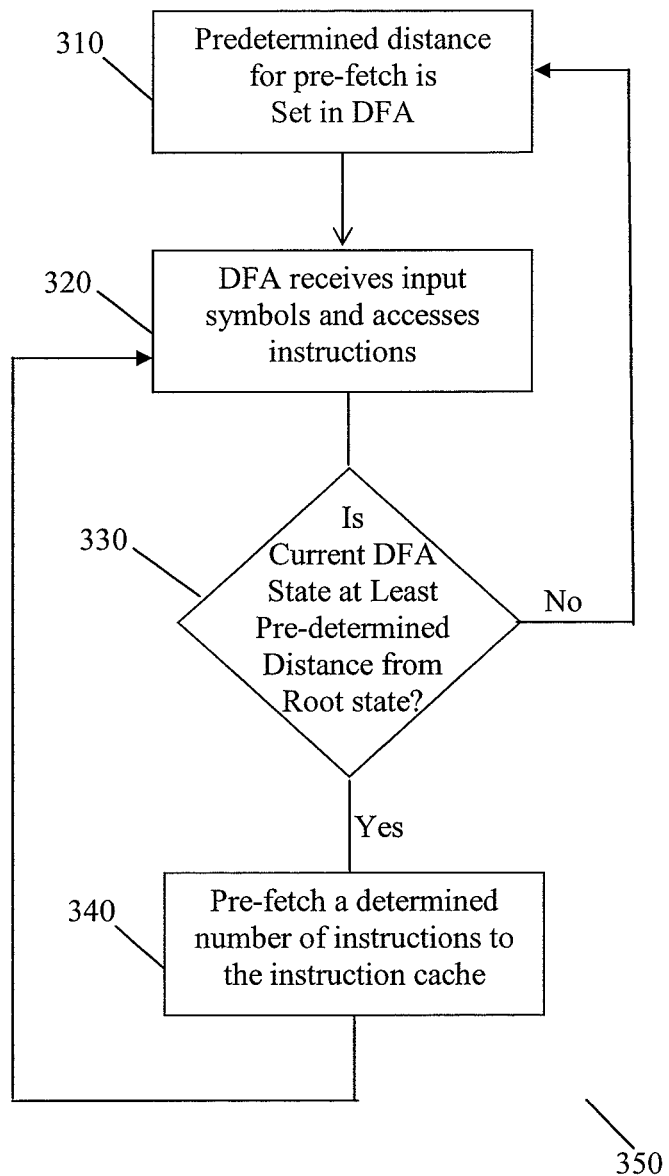
FIG. 3 is a flow diagram of an embodiment of a depth-derived instruction pre-fetch in a DFA.

FIG. 3 is a flow diagram of an embodiment of a depth-derived instruction pre-fetch in a DFA. A first step 310 indicates the setting of a value for the descent depth of the DFA for when instructions will be pre-fetched. The DFA will receive input symbols and access instructions 320. If the descent of the DFA is beyond a threshold depth away from the root state 330, a number of instructions will be pre-fetched to the instruction cache 340. If the depth is not beyond the threshold, the DFA will continue normally and access and execute a next instruction 320. After the pre-fetch 340, the DFA will access a next instruction and proceed normally 320. The DFA may pre-fetch instructions at each instruction execution 320 even though a pre-fetch occurred at a previous instruction. As noted, the cache is enabled to determine if it has the instructions for which the pre-fetch is issued. If the instructions are already in the cache, then no further action is required. However, for the instructions that are not in the cache, those instructions can be pre-fetched. The successive nature of the pre-fetch ensures that next instructions are more likely to be in the cache. Also, since the pre-fetch is repetitive, a full pre-fetch of all requested instructions is not necessarily performed on each request. It is understood that there are alternatives and modifications to the method shown in FIG. 3, as discussed in this disclosure.

In an embodiment of the invention, the DFA engine and instruction cache may be configured to pre-fetch some predetermined number of instructions after an accessed instruction. This occurs only when the accessed instruction is for a state several levels away from the root. The state at the beginning of the additional states for a single long rule 120 would be such a state. As noted, the threshold depth for the DFA 100 is shown as 3. The cache may be configured to accept a pre-fetch request with each instruction access and always, or when practical, fulfill such a request by making sure the requested number of successive instructions after the accessed instruction are present in the cache. If the successive instructions are not present, the cache will fetch them. The DFA engine may be configured to count steps taken during a DFA descent and compare this depth value with a fixed or configurable depth threshold. When the depth exceeds the threshold, the DFA engine will request pre-fetch with each additional instruction access to the cache. The length of pre-fetch requested may be a single fixed or configurable value. It may also be a fixed or configurable function of the depth. For example, pre-fetch length could be 0 for depth<4, 4 for depth=4, 8 for depth=5, 12 for depth=6 and 16 for depth>6. This table, in essence, may be hardwired into the DFA. The table may also be loadable into the DFA engine. It is understood that these are examples and the user of a DFA engine may be allowed to configure the depth according to the use of the DFA.

Figure 4:
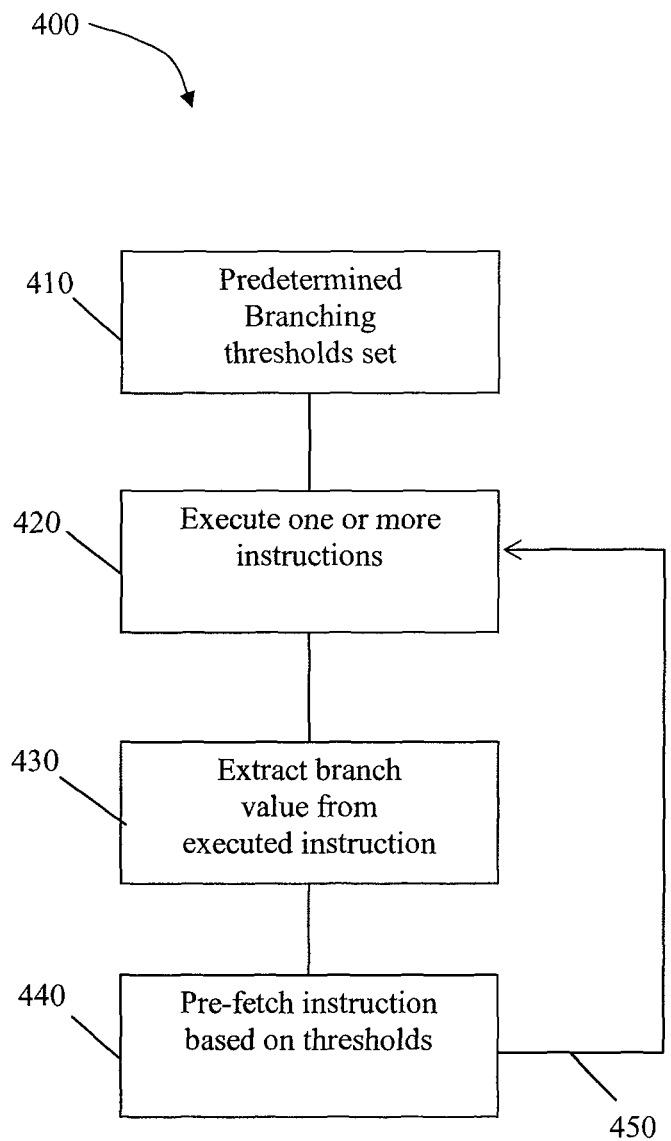
FIG. 4 is a flow diagram of an embodiment of a branch-derived instruction pre-fetch in a DFA.

FIG. 4 is a flow diagram of an embodiment of a branch-derived instruction pre-fetch in a DFA. Branching thresholds are set 410. As instructions are executed 420, the branch value for states and transitions is extracted from the instructions 430. Based upon a comparison between the threshold and the branch value of a state, a pre-fetch request may be made. As noted above in relation to FIG. 3, the pre-fetch may be incremental based on which instructions are already in the cache. The DFA will continue to execute instructions normally 450 and issue pre-fetch requests based on branching values. It is understood that there are alternatives and modifications to the method shown in FIG. 4, as discussed in this disclosure.

In an embodiment of the invention, a method is used to determine the pre-fetch length to request with each cache instruction accessed. As noted, state branching is typically higher near the root state and some sparse access patterns are caused by high branching states. Accordingly, state branching can also be used to guide pre-fetch requests. Each instruction access after the root state is determined by executing one or more previous instructions in conjunction with examined input symbols. The previous instructions typically contain some indication of the branch count of the corresponding state. This branching value can be extracted from each instruction executed and used to determine the pre-fetch length to request with the next instruction access in the DFA descent. If the branching value is high, then zero pre-fetch may be requested. If the branching value is low (below a predetermined threshold), then a fixed or configurable pre-fetch length may be requested. The threshold can be 2 or 4, for example. As with a depth-derived pre-fetch, branching-derived pre-fetch may be a fixed or configurable function of the value. For example, pre-fetch length could be 0 for branching greater than 3, 4 for branching equal to 3, 8 for branching equal to 2, and 16 for branching equal to 1.

This embodiment of branching-derived pre-fetch minimizes cache misses while matching a long rule. This is because, after many symbols, rules have mostly distinguished themselves from other rules and branching is low. It is also likely to avoid cache pollution. This is because sparse access patterns occur primarily in high branching areas of the DFA, including near the root. Branching-derived pre-fetch has the additional feature that if high branching reappears in a DFA far from the root, resulting in sparse access patterns, the pre-fetch selection will adapt accordingly.

In an embodiment of the invention, a method is used to determine the pre-fetch length to request with each cache instruction accessed. DFA instructions may be equipped to encode pre-fetch hints. The hints are determined by a DFA compiler or other tool. The pre-fetch hints are read by the DFA engine and used to request corresponding pre-fetch lengths from the instruction cache. Pre-fetch hints may be selected by the compiler or other tool based on distance from the root state or branching, according to the embodiments discussed above. Pre-fetch hints may also be selected to cover only or mostly following instructions reachable by transitions from the current state. For example, in the last several instructions used to match a given rule, only a small number of following instructions associated with that rule will remain reachable. Pre-fetch hints may accordingly be set increasingly small to cover only those remaining instructions. Hints may be annotated into the instructions by a compiler enabled to do so. The compiler will be able to determine the number of reachable instructions from a certain state and annotate the instructions accordingly. It is understood that instructions may be locatable in a number of different manners depending on how a compiler operates. The compiler may lay out the instructions in memory in a branch oriented fashion or in a manner which takes descent depth into consideration; for example, the compiler may order instructions according to a depth-first or breadth-first traversal of the DFA graph. Since instructions are pre-fetched sequentially, and since the compiler will know how it is organizing the instructions, the compiler will be able to determine which instructions are reachable from a certain state and limit pre-fetch accordingly.

Pre-fetch hints may be included in instruction formats that have room, but DFA depth or state branching may be used to select pre-fetch length when no hint is present in an instruction. Pre-fetch hints may be encoded in types or formats of DFA instructions corresponding to low-branching states. This is because low-branching instructions may have spare room available to encode pre-fetch hints, whereas high-branching instructions require more of other information, and may not have room for pre-fetch hints. Pre-fetch is generally not particularly useful in high branching instances, so there may be little or no cost to omitting pre-fetch hints from high branching instructions.

Depth-derived pre-fetch may over-ride branching-derived pre-fetch at low branching or high branching, or a fixed or configurable function of both depth and branching variables may be employed. The embodiments of the invention may thereby be combined.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of pre-fetching instructions to an instruction cache for a Deterministic Finite Automaton (DFA) engine during a DFA descent, said DFA descent comprising a transition depth and a branching value, said method comprising:
   accessing an instruction from an instruction cache; and
   pre-fetching a number of instructions immediately following the accessed instruction to the instruction cache, wherein the number of instructions is selected based on at least one of the transition depth or the branching value.

2. The method of claim 1, wherein the number of instructions is selected based on the transition depth.

3. The method of claim 2, wherein said selection is by comparing the transition depth with a threshold value and selecting the number of instructions to be zero only if the transition depth is less than the threshold.

4. The method of claim 1, wherein the number of instructions is based on the branching value.

5. The method of claim 4, wherein the number of instructions is determined by comparing the branching value to a threshold and pre-fetching zero instructions only if the branching value is greater than the threshold.

6. The method of claim 1, wherein the number of instructions is based on the transition depth and the branching value.

7. The method of claim 1, wherein at least one instruction contains a pre-fetch hint, and if an executed previous instruction contains a pre-fetch hint, the number of instructions selected is based on the contained hint.

8. The method of claim 7, wherein if the previous instruction does not contain a hint, the number of instructions is zero.

9. The method of claim 7, wherein if the previous instruction does not contain a hint, the number of instructions is a predetermined value.

10. The method of claim 7, wherein if the previous instruction does not contain a hint, the number of instructions is based on the transition depth.

11. The method of claim 10, wherein the number of instructions is selectable by comparing the transition depth with a threshold value and a selected number of instructions is zero only if the transition depth is less than the threshold.

12. The method of claim 7, wherein if the previous instruction does not contain a hint, the number of instructions is based on the branching value.

13. The method of claim 12, wherein the number of instructions is determined by comparing the branching value to a threshold and pre-fetching zero instruction only if the branching value is greater than the threshold.

14. A system of pre-fetching instructions into an instruction cache for use in a Deterministic Finite Automaton (DFA) engine, said system comprising:
   an instruction cache enabled to fetch instructions from an external memory; and
   a DFA engine enabled to access instructions from the instruction cache, and to execute said instructions and to request pre-fetch of instructions to the instruction cache based on an algorithm, wherein the algorithm is based on at least one of a transition depth of a DFA descent or a branching value of the DFA descent.

15. The system of claim 14, wherein the algorithm is based on the transition depth.

16. The system of claim 14, wherein the algorithm is based on the branching value.

17. The system of claim 14, wherein the algorithm is based on the transition depth and the branching value.

18. The system of claim 14, wherein the algorithm is based on a pre-fetch hint contained in at least one instruction.

19. The system of claim 14, wherein the algorithm is based on a pre-fetch hint contained in at least one instruction and the transition depth.

20. The system of claim 14, wherein the algorithm is based on a pre-fetch hint contained in at least one instruction and the branching value.

21. The system of claim 14, wherein the algorithm is based on a pre-fetch hint contained in at least one instruction and the transition depth and the branching value.

22. One or more non-transitory computer-readable media comprising a plurality of instructions stored thereon that in response to being executed result in a DFA engine:
   accessing an instruction from an instruction cache;
   determining at least one of a branching value associated with the instruction and a transition depth associated with the instruction;
   determining a number of instructions based on at least one of the branching value or the transition depth; and
   pre-fetching the number of instructions.

* * * * *